United States Patent [19]

Becker

[11] 4,260,050
[45] Apr. 7, 1981

[54] PICK-UP AND DUMP MACHINE

[75] Inventor: Anton Becker, Neuss, Fed. Rep. of Germany

[73] Assignee: Maschinenfabrik Buckau R. Wolf Aktiengesellschaft, Grevenbroich, Fed. Rep. of Germany

[21] Appl. No.: 937,271

[22] Filed: Aug. 28, 1978

[30] Foreign Application Priority Data

Oct. 9, 1977 [DE] Fed. Rep. of Germany ....... 2740896

[51] Int. Cl.³ ...................... B65G 65/02; B65G 37/00
[52] U.S. Cl. ..................................... 198/508; 198/585
[58] Field of Search .............. 198/508, 511, 585, 312, 198/317, 318, 519; 414/133

[56] References Cited

U.S. PATENT DOCUMENTS

| 3,472,357 | 10/1969 | Strocker et al. | 198/508 |
| 3,487,910 | 1/1970 | Strocker et al. | 198/508 |
| 3,509,985 | 5/1970 | Fisher | 198/508 |

FOREIGN PATENT DOCUMENTS 1229913 12/1966 Fed. Rep. of Germany.

*Primary Examiner*—Joseph E. Valenza
*Assistant Examiner*—Brian Bond
*Attorney, Agent, or Firm*—Michael J. Striker

[57] ABSTRACT

A pick-up and dump machine is mounted on rails for travel along the length of the intermediate space between two parallel row-like mounds of material piled on a storage field. A conveyor belt extending along the length of such intermediate space can feed material to and from the pick-up and dump machine. The machine is provided with supports engaging the conveyor belt to form a conveyor-belt loop having an infeed run terminating in a dump end followed by an intermediate run, followed by an outfeed run. A horizontally swingable dump boom has a dump conveyor whose inward end is located to receive material from the dump end of the conveyor-belt loop irrespective of the side to which the dump boom is swung. A horizontally swingable pick-up boom has a scoop conveyor which engages the side of a mound to be torn down and dumps onto the outfeed run of the conveyor-belt loop. The two booms and their conveyors can operate simultaneously, one receiving material from the conveyor belt while the other discharges material onto the belt, whereby a mound at one side of the machine can be built up while the mound at the other side is being torn down.

10 Claims, 3 Drawing Figures

PICK-UP AND DUMP MACHINE

BACKGROUND OF THE INVENTION

The present invention relates to machines used to build up and tear down mounds of dumped or piled pourable material on a storage field. Typically, such machines comprise a railway-mounted portal-shaped lower framework which spans and rides along the length of a long conveyor belt extending between two parallel row-like mounds, or the locations where such row-like mounds are formed. The conveyor belt has a loop which feeds material to and from the machine. Such machines usually have a pick-up boom provided with a scoop-up unit for tearing down a built-up mound, and a dump boom provided with a dump conveyor for dumping onto the storage field the material received from the conveyor belt system in order to build up a mound. The two booms are typically pivotally mounted, so that they can be raised and lowered. The pick-up boom is usually mounted on a generally C-shaped upper framework which is rotatably mounted on a lower framework provided with railway wheels, the end of the C-shaped upper framework being provided with a counter-weight for balance against the weight of the pick-up boom. The two booms are located diametrally opposite each other.

Federal Republic of Germany published allowed patent application DT-AS No. 1,229,913 discloses a pick-up and dump machine, wherein the dump end of the pick-up-boom is located above the aforementioned loop of the conveyor-belt system, with the dump end of the dump boom located below such loop. In order to counterbalance the weight of the dump boom, the dump boom is coupled to the counterweight boom. The conveyor-belt system which feeds material to and from the pick-up and dump machine must be reversible, and must be reversed in direction when changing over back and forth between pick-up operation and dumping operation. As a result, the pick-up and dump machine can only operate in the pick-up mode or else in the dump mode, at any given time. Furthermore, the height to which the dump boom is raised or lowered is determined by the height to which the pick-up boom is raised or lowered.

Federal Republic of Germany published allowed patent application DT-AS No. 1,281,942 teaches the combination of a pick-up boom and a bucket wheel, for the tear-down of a built-up dumped mound. However, such structure is not well suited when a long row-like dumped mound is to be torn down for materials-mixing purposes.

Federal Republic of Germany published allowed patent application DT-AS No. 1,221,147 discloses a pick-up and dump machine of this type, provided with a generally C-shaped upper framework having an additional counterpoise affording the requisite counterweight action. However, this pick-up and dump machine, likewise, is not capable of operating in both the pick-up and dump modes simultaneously.

SUMMARY OF THE INVENTION

It is the general object of the invention to provide a pick-up and dump machine having pick-up and dump booms which can be swung horizontally through 180° for alternately tearing down and building up a long row-like mound to either side of the railway of the machine, and furthermore having the capability of tearing down the mound to one side of the railway simultaneous with the building-up of the mound at the other side of the railway. It is also an object that the pick-up and dump booms, and their conveyors, be as independently controllable as possible, in particular to give the operator as much control freedom as possible when the pick-up and dump machine is during its railway travel operating in both the pick-up and dump modes simultaneously.

In the preferred embodiment of the invention, the pick-up and dump machine has a controllable-travel-speed lower framework provided with a V-shaped discharge chute which discharges onto the lengthwise extending conveyor-belt system from above. The pick-up boom is an angled structure provided with a scoop conveyor. One leg of the angled pick-up boom, or more precisely the part of the scoop conveyor on it, engages the side of a built-up mound and tears it down, the picked up material being transported up the one leg of the angled pick-up boom and then down and then up the other leg, reaching the dump end of the pick-up boom which is located above the V-shaped discharge chute. The angled pick-up boom can be raised and lowered, for control of the depth-of-cut of its scoop conveyor. Furthermore, the loop in the lengthwise conveyor-belt system has a dump end which is suspended from the C-shaped upper framework of the machine rotatable relative thereto, i.e., so that the direction in which the conveyor-belt loop extends does not change when the C-shaped upper framework is rotated in order to horizontally swing the pick-up boom.

In the preferred embodiment, the two booms and their conveyors are to the maximum extent possible independently controllable with respect to height, horizontally swung angular position and conveying rate, so that their positions and operations can be adjusted with respect to each other by the operator so as to match well, i.e., when the machine is operating in both the pick-up and dump modes simultaneously during its railway travel. The rate at which the conveyor-belt system is feeding material to the dump-boom conveyor determines how the booms of the machine should be operated and also how fast the machine should travel along its railway down the path between the two row-like mounds. In general, if the dump boom is receiving and therefore dumping a reduced amount of material, the travel speed of the machine is to be decreased, and the tear-down rate of the pick-up boom decreased, e.g., by decreasing the depth-of-cut of the scoop conveyor on the pick-up boom.

If the rate at which material is fed to the dump boom, and therefore the rate at which material is dumped onto the mound being built up, increases, then in general the travel speed of the machine is to be increased and the depth-of-cut of the pick-up boom's scoop conveyor increased. Thus, if the machine is operating simultaneously in both the pick-up and dump modes, i.e., tearing down one mound while building up the other, the operator can adjust the machine so as to establish a uniform build-up of the one row-like mound and, by varying the depth-of-cut of the pick-up boom's scoop conveyor, a relatively constant or uniform rate of tear-down and material removal from the other mound.

Because the pick-up boom's scoop conveyor tears down a mound along the whole height of the mound, there is achieved, in addition to the capability for constant of uniform tear-down action, a constant mixing action with respect to the material of the mound which is being torn down. Accordingly, the pick-up boom's scoop conveyor then exhibits, relative to prior-art pick-up systems, the advantage of a constant tear-down rate with constant mixing action despite variations in the travel speed of the machine.

Mound-tear-down machines employing scoop conveyors are already known, for example in French Pat. No. 627,046. However, such machines can only tear down a mound. An additional machine is needed to build up a mound. Also, such scoop-conveyor tear-down machines can only tear down a mound located to one side of the machine's travel path, and the tear-down system cannot be swung around to tear down a mounted located to the other side of the travel path.

A very important advantage inherent in the preferred embodiment of the invention is that the pick-up and dump booms can be swung around through 180°, so as to interchange positions, in a very simple way without at all interfering with the infeed loop of the lengthwise conveyor-belt system, and most certainly without requiring dismounting of the infeed loop. Furthermore, by using a V-shaped discharge chute, the dump end of the pick-up boom's scoop conveyor can orbit around the center of the discharge chute, and always be in a position to discharge properly into such chute. Despite the fact that the positions of the pick-up and dump booms can be interchanged by means of a 180° horizontal swing, the pick-up boom always dump into the V-shaped discharge chute and thereby always onto the same outfeed run of the lengthwise extending conveyor-belt system whereas the infeed run of the conveyor-belt loop always dumps onto the dump boom's conveyor. As a result the conveyor-belt system can be unidirectional, or operated unidirectionally, without interfering with the conveyor-belt system's simultaneous feeding of material to and from the pick-up and dump machine.

In order to be able to build up mounds of the desired row-like character, the dump boom is not merely capable of being raised and lowered, but is furthermore horizontally swingable independently of the upper framework of the machine.

In the preferred embodiment, the generally C-shaped upper framework which supports the pick-up boom is mounted on and borne by a turntable, for swinging movement of the pick-up boom. In order that the turntable not be overloaded, the dump boom is not borne by the turntable, but instead is borne by the lower framework of the machine. The dump boom is lifted and lowered pivotally relative to a horizontal pivot axis. Additionally, the dump boom can be horizontally swung with respect to a vertical mounting shaft or pillar borne by the lower framework. In this way, the inward end of the dump boom can be located at approximately the same height as the dump end of the pick-up boom's scoop conveyor, which makes for a relatively small total vertical height of the whole machine, i.e., considering the capabilities which the machine exhibits.

According to an advantageous concept of the invention, the counterweight for the generally C-shaped upper framework is provided on the end of an elongation of the upper horizontal leg of the C-shaped framework. Such location of the counterweight does not interfere with the lifting and lowering of the dump boom, and furthermore does not interfere with horizontal swinging of the upper framework and of the two booms because the conveyor-belt loop is located beneath the counterweight.

According to a particularly advantageous concept of the invention, when the dump boom is to be horizontally swung through 180°, it is first lowered or swung down and then swung horizontally through the space left free between the infeed and outfeed runs of the conveyor-belt loop.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

DESCRIPTION OF THE PREFERRED EMBODIMENT

Figure 1:
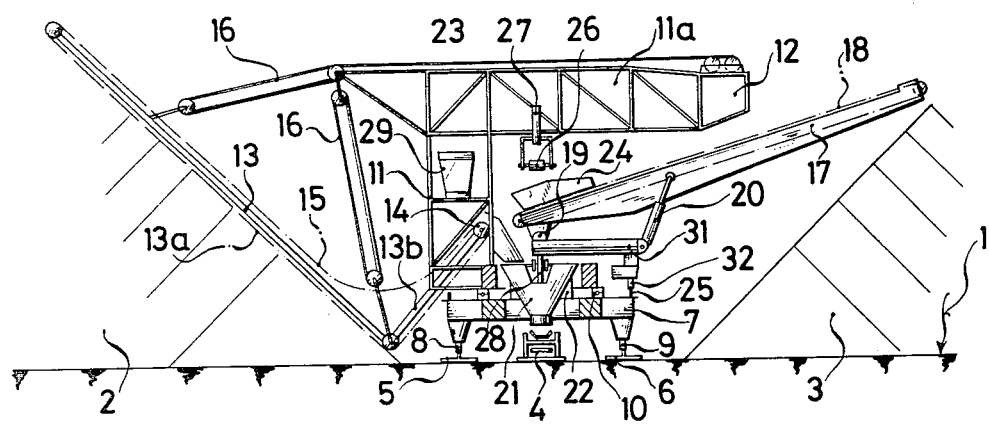
FIG. 1 is a view, partly in vertical section, of the inventive pick-up and dump machine, the travel direction of the machine being perpendicular to the plane of the illustration.
Figure 2:
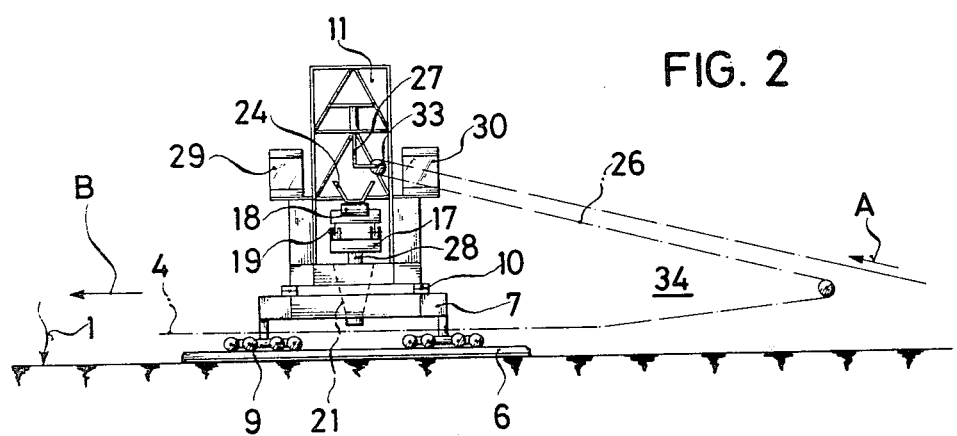
FIG. 2 is a view of the inventive pick-up and dump machine, the travel direction of the machine being parallel to the plane of the illustration.

In the Figures, numeral 1 denotes a storage field on which two parallel row-like mounds 2, 3 of dumped material are formed. Extending along the length of the space intermediate the two long mounds 2, 3 are two rails 5, 6 and a conveyor belt system 4. In FIG. 2, only the part of conveyor belt system 4 feeding into and from the illustrated machine is depicted. Riding on the rails 5, 6 are the wheels, 8, 9 of a combined pick-up and dumping machine. The railway wheels 8, 9 are provided on a portal-like lower framework 7, which travels above the conveyor belt system 4, i.e., with belt system 4 extending down the middle of the machine path, intermediate the left railway wheels 8 and the right wheels 9 of the machine. A turntable 10 is mounted on lower framework 7 and supports a generally C-shaped upper framework 11 for rotation about a vertical axis, the lower horizontal (and in FIG. 1 rightwardly extending) leg of the C-shaped framework 11 being mounted on turntable 10. The upper horizontal (and in FIG. 1 likewise horizontally extending) leg of the C-shaped framework 11 carries at its end a counterweight 12. Supported upon the vertical leg of the C-shaped framework 11, and extending out therefrom is a pick-up boom 13. The pick-up boom 13 comprises two scoop-conveyor guide frames 13a, 13b, imparting an angled shape to the pick-up boom 13 as a whole. The more outward scoop-conveyor guide frame 13a is inclined so as to lie against the sloping side of a built-up mound 2 as shown. Entrained about the guide frames 13a, 13b is an endless scoop conveyor 15, e.g., a scoop or bucket chain, the scoops or buckets of which are not illustrated. The scoop coveyor 15 travels upwards along the sloping side of mound 2 along a run at the bottom of guide frame 13a, then travels down along a run at the top side of guide frame 13a, then bridges over from guide frame 13a to guide frame 13b, turns over at a dump location at the right end of guide frame 13b, and then runs back along the underside of guide frame 13b. The scoop conveyor 15 is driven by a drive drum 14 located at the right or dumping end of scoop-conveyor guide frame 13b. The pick-up boom 13 is provided with height-adjusting means 16 for raising and lowering the pick-up boom. Here, the height-adjusting means 16 have the form of operator-controlled pulley-and-cable units which also serve to suspend the pick-up boom 13. These are provided for control of the height of the pick-up boom 13, and in particular the depth to which the scoops of the scoop conveyor thereof cut into the sloping side of the mound 2. The advantage of controllable depth-of-cut is explained further below.

The material picked up by the scoop conveyor 15 on pick-up boom 13 is dumped via a transfer chute 23 into a V-shaped discharge chute 21. The transfer chute 23 is mounted on the vertical leg of the generally C-shaped upper framework 11, i.e., so as to travel with framework 11 when the latter is turned on turntable 10. The V-shaped configuration of the discharge chute 21 assures that the transfer chute 23 will discharge into chute 21, no matter which side of the illustrated pick-up and dump machine the pick-up boom 13 is at. The V-shaped discharge chute 21 can be bifurcated, i.e., of two-inlet construction, so that the transfer chute 23 can dump thereinto for diametrically opposite locations of the transfer chute 23, but is preferably of annular construction and of V-shaped cross-section, so that transfer chute 23 can dump into it no matter what the angular position of upper framework 11 and chute 23. Supports 22 support the V-shaped discharge chute 21 on the lower framework 7. In the illustrated embodiment, the vertical rotation axis of the turntable 10 and therefore of the C-shaped upper structure 11 mounted thereon coincides with the center of discharge chute 21. Extending out from the open end of the C-shaped upper framework 11, and located more or less diametrically opposite to the pick-up boom 13, is a dump boom 17 provided with an endless dump conveyor 18. Dump boom 17 is horizontally swingable and also can be raised and lowered. In particular, the dump boom 17 is mounted for movement about a horizontal pivot axis, as indicated at 19, so that boom 17 can be pivotally raised and lowered. A hydraulic or purely mechanical height-adjusting means 20 controls the extent to which boom 17 is pivotally raised and lowered. One end of height-adjusting means 20, here shown as a hydraulic strut, is coupled to the dump boom 17, and its other end is coupled to a swing frame 31. The weight of the dump boom 17 is borne by the swing frame 31. Swing frame 31 is mounted on the lower framework 7, which latter bears the weight of the swing frame 31 and thereby of the dump boom 17. In particular, swing frame 31 at its radially inward end is mounted for horizontal swinging movement on a vertical mounting shaft or pillar 28. The radially outward end of swing frame 31 is provided with railway wheels 32 which ride on a horizontal circular rail 25 whose center coincides with the axis of vertical mounting shaft 28. Swing frame 31 can thus be rotated through 360°, riding on the circular rail 25 on the lower framework 7. The weight of swing frame 31 is borne, in particular, by the radially inward mounting shaft 28 and by the radially outward railway wheels 32 and circular rail 25. The vertical mounting shaft 28 about which swing frame 31 swings is located and supported in the center of the V-shaped or V-cross-section discharge chute 21; this makes it possible to mount the radially inward end of dump boom 17 lower than would otherwise be possible, and accordingly makes for a lower overall structural height, i.e., for a pick-up and dump machine which is to have the capabilities described herein.

The illustrated pick-up and dump machine is provided with a conveyor-system loop 26 which travels along with the machine. I.e., the conveyor belt system 4 per se extends along the length of the space intermediate the two parallel mounds 2, 3, but the machine is provided with a framework which forms the conveyor-system loop 26. The conveyor-belt loop 26 has an infeed run which extends in the direction of arrow A and rises up to a dump point 33, then turns over and travels back in the direction opposite to arrow A, and then turns over again to form an outfeed run which extends generally horizontally, passing beneath the lower framework 7 intermediate the left and right railway wheels 8, 9 thereof, emerging out ahead of the illustrated pick-up an dump machine. The dump point 33 at the end of the infeed run of conveyor-belt loop 26 is located beneath the upper horizontal leg of the C-shaped upper framework 11. The guide drum, or the like, forming the dump or turn-over point 33 is suspended from the underside of the upper horizontal leg of C-shaped upper framework 11 from a vertical hang shaft, or other suspension means, such that the conveyor-belt loop 26 can swing horizontally about a vertical swing axis which coincides with the vertical mounting shaft 28 about which the swing frame 31 carrying the dump boom 17 swings. In this way, if the C-shaped upper framework 11 is swung horizontally by means of turntable 10, the direction in which conveyor-belt loop 26 extends is not altered, and the location of the dump or turn-over point 33 of loop 26 stays substantially constant directly above mounting shaft 28. Actually, with the structural and in particular the swing-mount relationships depicted, both the pick-up boom 13 and the dump boom 17 can be horizontally swung around through 360° without necessitating removal or dismounting of the conveyor-belt loop 26. If the dump boom 17 is to be horizontally swung from an angular position located at one side of conveyor-belt loop 26, to an angular position located at the other side thereof, the dump boom 17 is first swung down and then horizontally swung through the space 34 left free between the upper infeed and turn-over runs of conveyor-belt loop 26 and the lower or outfeed run thereof.

When material is to be dumped onto the dump field 1, the material is fed onto conveyor belt 4, travels up in the direction of arrow A on the infeed run of conveyor-belt loop 26, and dump off at dump point 33, down through a dump chute 24 onto the dump conveyor 18 of dump boom 17, is conveyed to the radially outward end of boom 17, and dumped onto mound 2 or mound 3 depending upon the angular position of the horizontally swingable dump boom 17. In FIG. 1, the material is being dumped onto mound 3. The liftable, lowerable and horizontally swingable dump boom 17 can readily be positioned so that the dumped material forms a mound 3 of the desired neat and straight or row-like structure.

In FIG. 1, it is to be understood that, during the previous trip of the pick-up and dump machine, material had been dumped to the left to form the long row-like mound 2. During the working trip illustrated in FIG. 1, as material is being dumped off dump conveyor 18 onto mound 3, the scoop conveyor 15 on pick-up boom 13 is picking up material off of mound 2. In particular, the upwardly inclined bottom scoop-conveyor run on frame 13a engages the side of the mound and its scoops rag along the mound 2 scooping up material therefrom. The thusly scooped-up material then travels around over the top run of scoop-conveyor 15, is dumped through transfer chute 23 and V-shaped discharge chute 21 onto the outfeed run of the conveyor belt 4 and carried away in the direction of arrow B. When mound 2 has been torn down to ground, and mound 3 meanwhile been built up, then pick-up boom 13 and dump boom 17 are each horizontally swung through 180°, so that now material can be picked up off mound 3 by the scoop conveyor 15 on pick-up boom 13 with material fed in by conveyor 4 being dumped off dump boom 17 onto mound 2.

Figure 3:
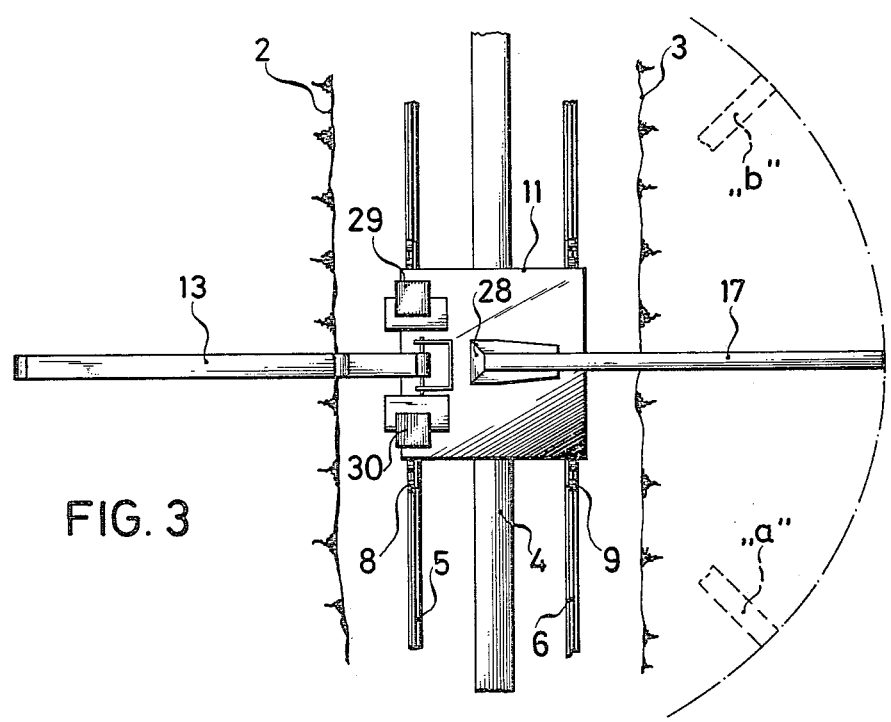
FIG. 3 is a top view looking down upon the inventive pick-up and dump machine.

The generally C-shaped upper framework 11 is provided with two observation pulpits 29, 30, located to either side of the vertical leg of the framework 11, as best seen in FIG. 2, at the side of the machine facing the pick-up boom 13. The observation pulpits 29, 30 are so located as to afford as nearly a 360° range of view as possible. If the dump boom 17 is in the angular position "a" shown in FIG. 3, then the operator of the pick-up and dump machine must stand in observation pulpit 30, to have a good view of both the pick-up operation and the dumping operation. If the dump boom 17 is in the angular position "b", then the operator stands in pulpit 29, to have a good view of both booms 13, 17. For example, both observation pulpits can be provided with operator control panels. The operator controls the pick-up and dumping operations from these pulpits.

Typically, the illustrated pick-up and dump machine will travel back and forth along the length of the rails 5, 6, first picking up material off of one built-up mound while dumping material onto the other mound, and then vice versa during its next working trip. The travel speed of the machine, i.e., in particular of its railway wheel-mounted lower framework 7 is operator-controllable, as are also the positions of the two booms 13, 17 and the speeds of operation of the two conveyors 15, 18. Importantly, the speeds of operation of the two conveyors 15, 18 are independently controllable, and by virtue of the operator-controlled height-adjusting means 16 the depth-of-cut of the scoop conveyor 15 is controllable. In this way, the operator is afforded sufficient control capabilities for optimally controlling both the pick-up and dumping operations, so that the mound being built-up can be controllably built-up to have the shape desired, with the other mound being torn down at a controllable rate so that the build-up and tear-down rates match, and so that the machine can travel along its railway at optimum speed.

For example, in the situation depicted in FIG. 1, the build-up of mound 3 may have a tendency to proceed less uniformly than the tear-down of the already and very well built-up mound 2. If mound 2 has already been well built up, and if the illustrated machine travels at constant speed along its railway with the scoop or pick-up conveyor 15 operating uniformly, the tear-down of mound 2 will be proceeding smoothly and regularly. In contrast, the material being fed to the machine on the infeed run of conveyor-belt loop 26 may vary as to quantity, even for example to the extent of being delivered somewhat batchwise. As a result, during the intervals of low-quantity feed of material to the machine, the mound 3 will be building up at a rate lower than the mound 2 is being torn down. The operator can deal with this situation in several ways. One way is for him to lower the speed of operation of scoop conveyor 15, to thereby lower the tear-down rate of mound 2. Alternatively or in addition thereto, the operator can slightly raise up the pick-up boom 13, to thereby decrease the depth-of-cut of the scoop conveyor 15 and lower the tear-down rate in that way. Simultaneously, the operator may wish to lower the travel speed of the machine, so that the machine can dwell longer at this location, to allow more time for the mound 3 to build up to desired height.

If the rate at which material is being fed to dump conveyor 18 via the infeed run of conveyor-belt loop 26 decreases, then self-evidently merely increasing the operating speed of dump conveyor 18 will not increase the built-up rate of mound 3. However, if the infeed rate has increased, a speed-increase of dump conveyor 18 may be appropriate.

A skilled operator can control the positions and keep the conveying rates continually adjusted so that the tear-down and build-up rates match well. If the operator misjudges, he can for example always slow down the travel speed of the machine and reduce the pick-up rate of scoop conveyor 15, until the situation again equalizes. Often, the operator may for example wish to have the pick-up and dump machine travel with dump boom 17 swung out to angular position "a" or angular position "b" at all time during machine travel, so that the operator can stand in one or the other of the observation pulpits 29, 30 and therefore have a better simultaneous view of the pick-up and dump operations than if the two booms 13, 17 were positioned exactly diametrically opposite each other. In any event, the operator, with the construction of this preferred exemplary embodiment, certainly has the greatest possible freedom in controlling the operation of the machine according to the prevailing situation—and this in addition to the important switchover capability whereby the booms 13, 17 can be each swung through 180° for alternate tear-down and build-up of the two mounds 2, 3.

It will be understood that each of the elements described above, or two or more together, may also find a useful application in other types of constructions differing from the types described above.

While the invention has been illustrated and described as embodied in a pick-up and dump machine of particular type it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. A conveyor loading and unloading machine adapted to travel along the space intermediate two parallel mounds of bulk material, comprising conveyor belt means extending along the intermediate space and adapted to feed bulk material to and from the machine; a lower framework mounted for controlled-speed travel along the length of the intermediate space, said lower framework being located above and in a spaced relation to a portion of said conveyor belt means; an upper framework mounted on said lower framework for horizontal swinging movement; an angled pick-up boom mounted on said upper framework for horizontal swingable movement together with said upper framework, said angled pick-up boom including a scoop conveyor embracing the length thereof, a first outward leg at which said scoop conveyor engages one mound with bulk material and a second inward leg terminated with a scoop-conveyor dump end; means for lifting and lowering said pick-up boom; said conveyor belt means forming a conveyor-belt loop adapted to travel along with said lower framework, said conveyor-belt loop including an infeed run to feed bulk material into the machine, an intermediate run and an outfeed run extending beneath said lower framework to discharge material from the machine; means for suspending said conveyor-belt loop from said upper framework rotatable about a vertical axis relative to said upper framework to prevent change in the direction of extension of said conveyor-belt loop when said upper framework is horizontally swung; an intermediate chute connected to said scoop-conveyor dump end, a V-shaped discharge chute mounted on said lower framework and adapted to receive bulk material from said intermediate chute irrespective of the position in the swingable movement of said pick-up boom and to discharge the material onto said outfeed run of the conveyor-belt; and a dump boom, said dump boom at its inward end being mounted on said lower framework for a horizontal swingable movement between the infeed run and the outfeed run and for lifting and lowering movement and having a dump conveyor arranged to receive the bulk material dumped from said conveyor-belt loop, said dump boom extending outwardly from said lower and upper frameworks at the side diametrically opposite to said pick-up boom whereby said pick-up and dump booms can be swung around so as to interchange their positions without interfering with said conveyor-belt means.

2. The machine defined in claim 1, the upper framework being generally C-shaped and having lower and upper horizontal legs and joining them a vertical leg and being provided with a counterweight to balance off the weight of the pick-up boom.

3. The machine defined in claim 2, the end of the upper horizontal leg of the generally C-shaped upper framework having an elongation extending out past the end of the lower horizontal leg thereof, the counterweight being mounted on such elongation.

4. The machine defined in claim 2, the machine furthermore including two observation pulpits, each mounted on the generally C-shaped upper framework to a respective side of the vertical leg of the generally C-shaped upper framework and affording to an operator located in such pulpit a substantially 360° view of the pick-up and dump machine.

5. The machine defined in claim 1, the inward end of the dump boom and dump conveyor being located at approximately the same vertical elevation as the dump end of the scoop conveyor.

6. The machine defined in claim 1, the machine including a swing frame mounted on said lower framework for horizontal swinging movement, the dump boom being mounted on and borne by the swing frame, and furthermore including height-adjusting means for lifting and lowering the dump boom and comprising a controllable-length unit having one end connected to the dump boom and another end connected to the swing frame.

7. The machine defined in claim 1, the scoop conveyor on the pick-up boom being provided with a controllable-speed drive unit driving the scoop conveyor.

8. The machine defined in claim 7, the lower framework being provided with a circular rail encircling the V-shaped discharge chute, and furthermore including a railway wheel riding around the circular rail and mounting and bearing the weight of the dump boom.

9. The machine defined in claim 1, the dump boom at its inward end being mounted on said the lower framework for horizontal swinging movement of the dump boom on a vertical swing-mount structure extending along the center of the V-shaped discharge chute.

10. A conveyor loading and unloading machine which adapted to travel along the space intermediate two parallel row-like mounds of piled pourable material tearing down and building up such mounds and cooperating with a conveyor belt which likewise extends along such intermediate space and feeds pourable material to and from the pick-up and dump machine, the machine comprising, in combination, a travelling framework mounted for travel along the length of such intermediate space; means on the framework engaging the conveyor belt and forming a conveyor-belt loop which travels along with the framework, the conveyor-belt loop having an in-feed run which feeds material up to the machine and terminates in a dump end, an intermediate run, and an out-feed run extending out from the machine for feeding material away from the machine; a dump boom mounted on the framework for lifting and lowering motion and also for horizontal swinging motion between the infeed run and the outfeed run, to diametrically opposite sides of the framework, the dump boom being provided with a dump conveyor, the inward end of the dump boom being located to receive material dumped from the dump end of the conveyor-belt loop irrespective of which side of the machine the dump boom has been swung to, whereby the dump boom can build up a mound at either side of the path of travel of the pick-up and dump machine; and a pick-up boom mounted on the framework for lifting and lowering motion and also for horizontal swinging motion to diametrically opposite sides of the framework, the pick-up boom being provided with a scoop conveyor having a dump end, the scoop conveyor engaging the side of a mound to be torn down and conveying material removed from such mound to the dump end of the scoop conveyor, the dump end of the scoop conveyor being located to discharge material onto the outfeed run of the conveyor-belt loop irrespective of which side of the machine the pick-up boom has been swung to, whereby the pick-up boom can tear down a mound at either side of the path of travel of the pick-up and dump machine, and whereby the dump boom can build up a mound to one side of the travel path by receiving material from the dump end of the conveyor-belt loop while simultaneously the pick-up boom can tear down a mound to the other side of the travel path by discharging removed material onto the outfeed run of the conveyor-belt loop.

* * * * *